(No Model.)

G. W. PAINE.
HITCHING STRAP.

No. 348,991. Patented Sept. 14, 1886.

Witnesses
J. M. Nilem
H. Bernhard

Inventor
Geo. W. Paine
By his Attorneys
C. A. Snow & Co.

UNITED STATES PATENT OFFICE.

GEORGE WASHINGTON PAINE, OF ODESSA, NEW YORK.

HITCHING-STRAP.

SPECIFICATION forming part of Letters Patent No. 348,991, dated September 14, 1886.

Application filed May 8, 1886. Serial No. 201,579. (No model.)

*To all whom it may concern:*

Be it known that I, GEORGE WASHINGTON PAINE, a citizen of the United States, residing at Odessa, in the county of Schuyler and State of New York, have invented a new and useful Improvement in Hitching-Straps, of which the following is a specification.

My invention relates to improvements in hitching-straps; and it consists in the peculiar and novel construction and combination of parts, substantially as hereinafter fully set forth, and particularly pointed out in the claims.

My invention is especially designed as an improvement in that class of hitching-straps shown in the patent to Samuel Birdsall, No. 332,779, dated December 22, 1885, in which a neck-strap is provided with a tie-strap and a brace-strap, the whole comprising the hitching-strap.

In the patent above referred to the tie-strap is provided with a brace-strap that is adjustably secured thereto by means of a "coupling," that is rigidly held on the tie-strap by means of a threaded bolt and nut. The brace-strap is thus held stationary on the tie-strap, which is very objectionable, from the fact that when the horse throws his head back all of the strain is brought on the bridle-bit and the tie-strap, which is liable to displace or break the same.

The object of my invention is to obviate the objections above referred to, and to provide an improved device which shall be capable of movement on the tie-strap to ease the strain on the bit and adjust itself to the movement of the animal's head, and to improve the said device in minor details of construction, so that it will be more simple, strong, and durable in construction, cheaper and less expensive of manufacture, and present a neater and more attractive appearance, all as will be hereinafter fully set forth.

Figure 1:
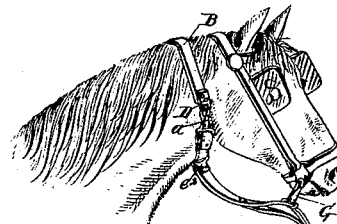
Figure 2:
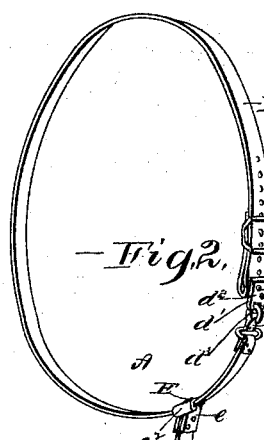
Figure 3:
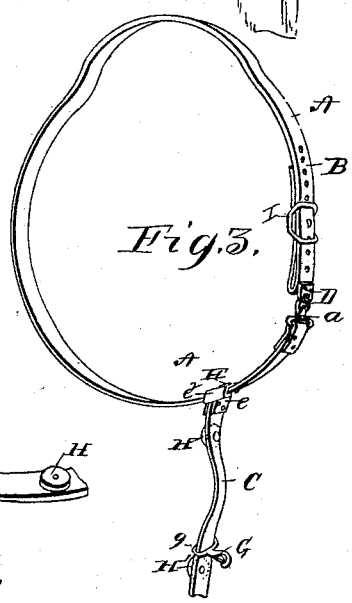
Figure 7:
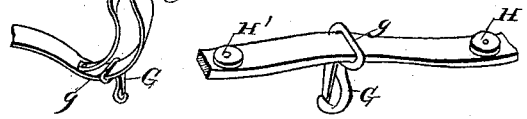
Figure 4:
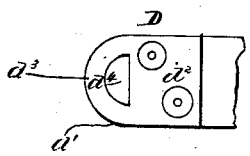
Figure 5:
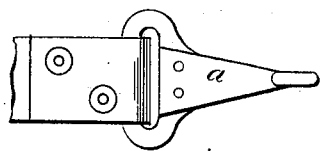
Figure 6:
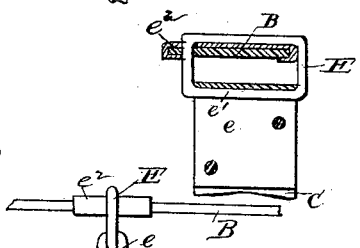

In the accompanying drawings, Figure 1 is a perspective view of my improved hitching-strap, showing it adjusted upon an animal for use. Fig. 2 is a detail perspective view of the invention detached from the animal. Fig. 3 is an enlarged perspective view showing a modification of my invention. Figs. 4, 5, and 6 are detached detail views of parts of my improvements. Fig. 7 is a detached view of the modification shown in Fig. 3.

Referring to the drawings, in which like letters of reference denote corresponding parts in all the figures, A designates my improved hitching-strap, which consists of the neck-strap B and the tie-strap C, the peculiar construction of the several parts of which I will now proceed to describe more fully and in detail.

The neck-strap B is provided at one end with an ordinary snap-hook, $a$, which is provided with a plate which laps over and is riveted thereto, as shown, to securely connect the hook to the strap, and the other end of the neck-strap carries a loop, D, which is also riveted thereto, and is shown more clearly in Fig. 4 of the drawings. The loop D comprises a plate, $d^2$, that is riveted to one end of the neck-strap, an open rectangular frame, $d'$, and a forwardly-curved bar, $d^3$, that is connected at its ends with the frame $d'$, and so arranged as to leave an open space, $d^4$, through which passes the snap-hook, whereby the snap-hook is prevented from coming in contact and wearing the leather of the neck-strap away, and a neater and more attractive appearance is given to the device.

The neck-strap is adapted to be passed around the neck of the animal, to which the device is adjusted, and the meeting ends of the strap are detachably connected together by the snap-hook engaging the curved bar of the loop D, while at the same time the parts are prevented from accidental displacement, and wear between them is reduced to a minimum.

E designates a loop, which is preferably rectangular in form, and one of the bars thereof is loosely journaled or fitted in the doubled or bent end of a wear-plate, $e$, which is riveted to one end of the strap C, so that the latter is permanently secured to the neck-strap. The other parallel bar of this rectangular loop bears on another metallic wear-plate, $e^2$, that is riveted to the neck-strap or stitched thereto, and one of the side bars of this loop passes through an opening in the plate $e^2$ and the strap B to retain the said loop in engagement with the neck-strap. One end of this tie-strap is adapted to be connected to a post or other immovable object, as is usual, and near the other end thereof, adjacent to the point of connection thereof with the neck-strap, is secured the free end of a limiting or stop strap, F, the said ends of the stop-strap being secured to the body of the tie-strap by means of rivets that pass through the limiting and tie straps to securely and firmly connect them together.

G designates a snap-hook that is provided with a loop, g, which embraces or is fitted to slide freely upon the tie-strap between the ends of the limiting-straps that are connected to the tie-strap, and this snap-hook is adapted to be connected to the bridle-bit, rings, or eyes, as is usual.

In lieu of employing the limiting-strap with the ends thereof secured to the tie-strap, a stop-plate, H, may be secured to the tie-strap at a suitable distance apart from another similar plate, H', both of which are constructed substantially or precisely alike. These stop-plates are shown in detail in Fig. 7 of the drawings, and they are preferably provided with a curved edge, and an opening or hole, through which a rivet passes to secure the plates to the tie-strap.

The operation of my invention is obvious. To adjust the device for use, the neck-strap is passed around the animal's neck, and the snap-hook a engaged with the loop D, and the snap-hook G is connected to the ring of the bridle-bit, the free end of the tie strap being secured to a post or other immovable object. When the animal raises its head or throws it to one side, the sliding snap-hook is free to move on the tie-strap to adjust itself to the movement of the animal's head, and at the same time relieve the strain on the bridle-bit and throw it on the neck-strap, which is of sufficient strength to withstand the force of the strain, and is not so liable to be broken or displaced. To detach the hitching-strap, it is only necessary to disengage the snap-hooks from the loop D and the ring of the bridle-bit.

It will be observed that I provide an improved hitching-strap which presents a very neat and attractive appearance, that is very simple and strong in construction, and, furthermore, that can be manufactured and sold at a reduced cost, and is less expensive than the device shown in the patent hereinbefore referred to.

I attach especial importance to loosely fitting the snap-hook G on the tie-strap, and providing means for limiting the movement of the said snap-hook on the strap, whereby the strain on the bridle-bit is relieved and is thrown on the neck-strap, and the said hook is free to adjust or accommodate itself to the movement of the animal's head and to the peculiar form of loop, whereby the snap-hook is prevented from coming in contact with the leather strap and wear between the parts is reduced.

Slight changes in the form and proportion of parts can be made without departing from the principle of my invention.

One end of the neck-strap B, preferably that end that carries the loop D, is bent or doubled upon itself, and over the doubled end is fitted a turn-buckle, I, of any preferred form, whereby the length of the neck-strap can be varied to adapt the device for use upon horses of different sizes.

Having thus fully described my invention, what I claim as new, and desire to secure by Letters Patent, is—

1. In a hitching-strap, the combination, with a neck-strap, of a tie-strap connected thereto, a sliding hook loosely fitted on the tie-strap, and stops for limiting the movement of the hook on the said strap, substantially as described, for the purpose set forth.

2. In a hitching-strap, the combination of the neck-strap having a snap-hook at one end and a loop, D, at the other end, having a frame and a curved bar, to the latter of which the snap-hook is adapted to be connected, a loop, E, also secured to the neck-strap, the tie-strap connected at one end to the loop D, the sliding hook G, loosely fitted on the tie-strap, and the limiting strap having its ends secured to the tie-strap, and the sliding hook confined between the said ends thereof, substantially as described.

3. The combination of a neck-strap, a loop, G, secured to one end of said strap, a buckle, I, fitted over the doubled end of the strap and adapted to be connected with the loop D, a tie-strap, C, connected with the neck-strap, a sliding hook fitted on the tie-strap, and means, substantially as described, for limiting the play of the sliding hook on the tie-strap, substantially as described.

4. The combination of a neck-strap having a loop or eye at one end and a snap-hook at the other end, a wear-plate, $e^2$, secured on the neck-strap, a tie-strap provided with a loop, E, which bears on the wear-plate, and has one bar thereof passed through aligned openings in the wear-plate and neck-strap, and means, substantially as described, for limiting the play of the hook, as specified.

In testimony that I claim the foregoing as my own I have hereto affixed my signature in presence of two witnesses.

GEORGE WASHINGTON PAINE.

Witnesses:
 LANE A. PAINE,
 GEORGE G. MONTGOMERY.